United States Patent [19]

Cardullo et al.

[11] 3,983,640
[45] Oct. 5, 1976

[54] ADVANCED G SEAT FOR AIRCRAFT SIMULATION

[75] Inventors: Frank M. Cardullo, Harpursville; William J. Hewitt; Gerald J. Kron, both of Binghamton, all of N.Y.

[73] Assignee: The Singer Company, Binghamton, N.Y.

[22] Filed: Nov. 6, 1974

[21] Appl. No.: 521,457

[52] U.S. Cl. ............................... 35/12 E; 35/12 H; 297/DIG. 3
[51] Int. Cl.² ........................................ G09B 9/08
[58] Field of Search .............. 35/12 R, 12 A, 12 H, 35/12 B, 12 C, 12 D, 12 E, 12 P, 12 S, 12 W; 5/349–351; 272/1 C; 297/DIG. 10, DIG. 3, 201, 284, 312, 423

[56] References Cited
UNITED STATES PATENTS

| | | | |
|---|---|---|---|
| 3,097,436 | 7/1963 | Gaucher | 35/12 E |
| 3,158,398 | 11/1964 | Stryker | 297/333 |
| 3,270,440 | 9/1966 | Radosevic | 35/12 E |
| 3,309,795 | 3/1967 | Helmore | 35/12 E |
| 3,479,087 | 11/1969 | Burke | 297/339 |

FOREIGN PATENTS OR APPLICATIONS

| | | | |
|---|---|---|---|
| 979,495 | 1/1965 | United Kingdom | 35/12 E |

OTHER PUBLICATIONS
Christensen, K. K. & Johnson, L. L.; "Study to Determine Methods of Simulating G effects;" Oct. 1958.
Gum, D. R.; "Modeling of the Human Force and Motion Sensing Mechanisms;" Ohio State University; 1972.

Primary Examiner—Richard C. Pinkham
Assistant Examiner—Vance Y. Hum
Attorney, Agent, or Firm—Jeffrey Rothenberg; James C. Kesterson

[57] ABSTRACT

A "G" seat for providing kinesthetic (sensation of motion) cues to a pilot of a simulated aircraft. The seat is designed specifically to stimulate elements of the haptic sensory system and is capable of independently producing desired skeletal attitude shifts, area of flesh contact changes and flesh pressure gradient variations and coordinating same to simulate acceleration effects. The seat contains two mosaics of air cells forming a seat cushion and a back cushion, respectively. The air cells comprise tension spring loaded bellows having rigid top plates. The top plates of the cells in each mosaic form a body supporting surface of the corresponding cushion. The cells may be individually driven under computer control to vary the elevation, attitude and shape of these body supporting surfaces. In addition, clam-shell shaped air cells are positioned on either side of the seat cushion to provide thigh pressure and area of contact variations and a lap belt is driven to provide ventral area pressure variation.

27 Claims, 11 Drawing Figures

ADVANCED G SEAT FOR AIRCRAFT SIMULATION

The invention herein described was made in the course of or under a contract or subcontract thereunder, with the Department of the Air Force.

BACKGROUND OF THE INVENTION

1. Field of the Invention

The invention relates generally to vehicle simulation and, more particularly, to a seat for inducing motion sensations similar to those experienced during actual operation of a vehicle. The invention is particularly useful in providing sustained acceleration cues and enhancing motion onset cues in an aircraft simulator.

2. Description of the State of the Art

Man's sensory systems provide the interface between him and his environment; through these systems travels the raw information used in learning and the maintenance of task proficiency. Aircraft simulation, a technique employed primarily for pilot training, naturally depends heavily on the role sensory systems play in this learning process. It has long been hypothesized in the simulator art that kinesthetic feedback from a pilot's sensory systems is important in mastering the piloting task.

Man is thought to perceive motion through at least three basic sensory systems; they are visual, vestibular and haptic systems. A detailed description of the role played by these sensory systems in kinesthetic determination may be found in a paper by G. J. Kron entitled "Motion Simulation Enhancement: the Development of a Research G-Seat System" printed at pages 14 – 54 in Proceedings of the Sixth Naval Training Equipment Center And Industry Conference, published Nov. 13, 1973, as NAVTRAEQUIPCENIH-226 report, which paper is incorporated by reference herein.

As pointed out in the referenced paper, the vestibular system, located in the inner ear, is the best known motion sensory system. The organs of this system not only detect body movement and gravity vector orientation, but also contribute to the sense of balance and orientation.

The haptic system, a lesser known and far from formalized system, deals in part with the perception known as "body feel." The elements of the haptic sensory system are employed in perceiving physiological changes which occur when an individual is subjected to motion variations. Most of these changes manifest themselves in one or more of four modalities: skeletal attitude changes, muscle tonal changes, pressure gradient changes, and touch or area of contact changes.

Consider, by way of example, physiological changes detected by the haptic system during an aircraft dive-pullout maneuver. In this sustained acceleration situation, the pilot is subjected to a "g" loading or increase in apparent body weight, proportional to the number of g's of acceleration experienced by the aircraft. Assuming the pilot is seated, one would expect his head, neck and upper torso to compress along the spinal axis, his shoulders to droop under the "added" weight of his upper arms, and his buttocks to sink deeper into the seat cushion, thereby decreasing the included angle between upper and lower portions of the legs. In other words, his body orientation will change slightly due to the increase in apparent weight. Further, one would expect the pilot's flesh to droop and thereby change the loading characteristics of his muscles. As the inertial weight of the pilot's torso increases, the pressure gradient over his buttocks will change as the primary bone structure in this region, the ischial tuberosities, transmit loading to the surface of the seat. The flesh trapped between the ischial tuberosities and the seat is subjected to increased pressure and the resultant change in pressure gradient in this area of the buttocks is detected by haptic system pressure-sensitive receptors. Finally, under increased g loading, the pilot settles deeper into the seat bringing a larger portion of his buttocks and thigh flesh area into contact with the seat. Receptor units allied with a sense of cutaneous touch would thus indicate that more of the seat is touching the pilot's flesh. From this example, it should be apparent that the combined response of the haptic system elements provides a fairly sophisticated definition of body position and motion.

In present day aircraft simulators, a simulated cockpit is supported on a motion base. The motion base or system is designed to reposition the simulated cockpit and is primarily directed towards influencing a pilot trainee's vestibular system. Until now, little overt effort has been aimed directly at the haptic system channels. The present invention thus represents a major departure from the prior art in that it is designed strictly for haptic system excitation.

Motion bases, owing to their mechanical constraints, produce the most useful stimuli, or "cues," during the onset phase of low-level, short-term accelerations. However, as the accelerations become larger in magnitude and longer in duration, the limits of the motion system are approached and cue generation constrained or terminated. The G seat of the instant invention is designed to provide a sustained acceleration cue as well as to complement the onset acceleration cue that is provided by the motion base.

A number of prior art devices have attempted to induce acceleration sensations by body manipulation. See, for example, U.S. Pat. Nos. 3,097,346; 3,270,440 and 3,309,795. These prior art devices fall into two categories of design: seats constructed of soft pliable bladders, and seats constructed of upholstered movable plates. The former are driven pneumatically and the latter through linkages by drive actuators.

A basic shortcoming of both of these former designs is the relatively small number of driven elements comprising the seat. The instant inventors have discovered that it is desirable necessary to use a mosaic of many elements in order to provide seat movement suitable to the various elements of the haptic sensory system. Further, it is required that each of these mosaic elements have an excursion range suitable to permit the composite of all mosaics to form plane changes in attitude, elevation and shape. In the prior art upholstered movable plate design, the linkage arrangement is discordant with a mosaic approach wherein each mosaic element must be small, yet have substantial excursion range.

A major detraction of the soft pliable bladder approach is the fact that conflicting stimuli are produced. Consider, again, the aircraft drive pullout situation. In order to cause a subject to settle in a seat composed of air bladders, the air pressure in the bladders is reduced, resulting in the desired skeletal attitude change. However, the air cells or bladders change shape under the pressure reduction and become more pliable and, consequently, fit the natural form of the buttocks more precisely, thereby reducing the buttocks flesh pressure gradient. As mentioned earlier, an increased flesh pressure graident, not decreased gradient, is desired under this acceleration condition. Equally as undesirable is the very turgid surface presented when the bladders attempt to shift the body upwards under footwards acceleration conditions.

Further complicating the soft bladders approach is the fact that its only loading is afforded by the body weight it supports. In attempting to provide a new elevation for the bladders, internal pressure of the bladders is altered and the body shifted until the new load "seen" by the bladders compensates for the pressure change. Such conditions permit the bladders to either completely collapse or completely distend if enough body load cannot be shifted between adjacent bladders. Seat cushion ballooning results. Although the problem can be minimized by shifting to a pneumatic drive based on controlling air mass (volume) rather than pressure, the conflicting stimuli problem will remain inherent in the pliable bladders.

Another shortcoming of the prior art seats is that they often require unusual straps or harnasses to control the movement of the subject's body and thus fail to maintain cockpit fidelity.

SUMMARY OF THE INVENTION

The instant invention overcomes the deficiencies of the prior art by providing a non-ballooning G seat which induces compatible haptic system stimuli to faithfully reproduce acceleration sensations.

According to the instant invention, a G seat is provided having back and seat cushions composed of mosaics of air (or other fluid) cells. The air cells comprise tension-spring loaded bellows having rigid top plates. By selectively controlling and coordinating the excursion of the top plates of the air cells, compatible skeletal attitude shifts, area of flesh contact and muscle tonal changes and flesh pressure gradient variations are produced. In addition, thigh panels composed of torsion-spring loaded, clam-shell shaped air cells having rigid top plates, are positioned on either side of the seat cushion to provide thigh pressure and area of contact variations. A lap belt, which can be driven in extension and contraction, provides area pressure variation.

Note that the top plates of the inventors' air cells isolate a subject's flesh from contact with the pneumatic cell and thus overcome the problem of conflicting skeletal attitude and flesh pressure sensations associated with the prior art bladder approach. Similarly, by employing spring-loaded bellows rather than pliable air bladders, cushion "ballooning" is eliminated.

One object of the present invention is to provide a G seat which produces sustained acceleration cues and enhances motion onset cues.

Another object of the invention is to provide means within, for example, an aircraft simulator for improving trainee piloting performance by providing a semblance of the kinesthetic sensations experienced by the trainee during execution of the actual task of piloting an aircraft.

Another object is to provide a G seat which can be used with a motion system of an aircraft or other vehicle simulator to safely, economically and accurately simulate changes in motion.

Still another object is to provide body supporting means within a vehicle simulator which looks and feels like a seat in the actual vehicle and thus, improves the fidelity of simulation while providing accurate kinesthetic feedback.

Yet another object is to produce G loading and other acceleration effects in a one G environment.

A further object is to provide kinesthetic information to an operator of a vehicle simulator by eliciting compatible haptic sensory system stimuli.

A still further object is to provide a contourable G seat capable of producing pressure gradient variations, skeletal attitude shifts, and area of flesh contact changes, independently and coordinating same to effectively simulate accelerations.

Other objects and advantages of the invention will, in part, be obvious and will, in part, appear hereinafter.

BRIEF DESCRIPTION OF THE DRAWINGS

These and other features of the present invention will be more clearly understood from a consideration of the following description taken in connection with the accompanying drawings in which.

DETAILED DESCRIPTION OF THE PREFERRED EMBODIMENT

Figure 1:
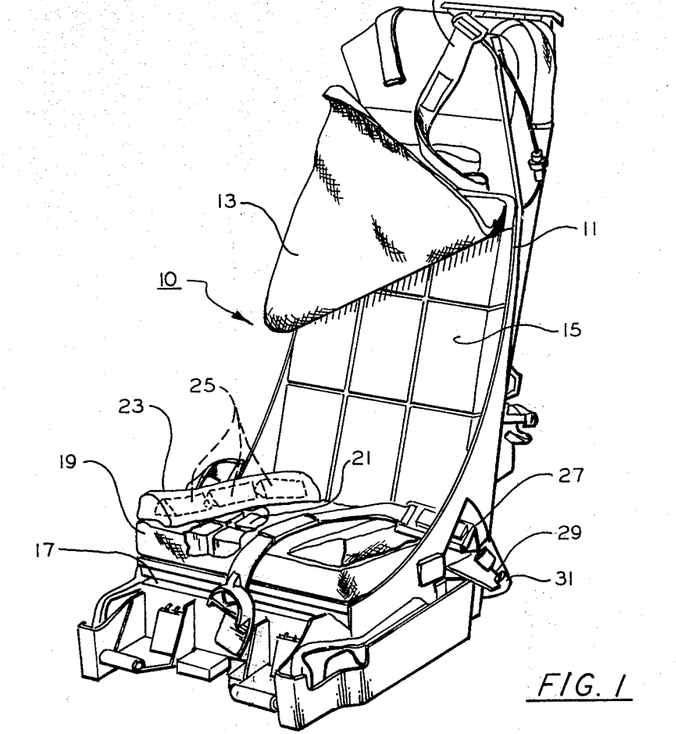
FIG. 1 is a perspective view of a preferred embodiment of the advanced G seat of the present invention.

The general configuration of the advanced G seat is depicted in FIG. 1. The seat 10 includes a backrest support 11 which supports a mosaic of, for example, none air cells 15. The air cells 15 are arranged in a three (wide) by three (high) matrix. These cells, enclosed in an upholstered cover 13 having elastic side panels, define the backrest or back cushion of the G seat.

A supporting structure 17 supports a seat pan or cushion 19. Seat cushion 19 includes a mosaic of, for example, 16 air cells 21. Air cells 21 are arranged in a four (wide) by four (deep) matrix and may be enclosed within a padded upholstered cover having elastic side panels.

The air cells of both the back and seat cushions have rigid top plates which are translatable in a direction perpendicular to the body supporting surface of the respective cushion. The air cells are pressure sensitive, excursion devices.

Located on either side of seat cushion 19, are thigh panels 23 for exerting pressure on and varying the extent of seat contact with, the outside of a seated subject's thighs. Each thigh panel 23 contains, for example, three clam-shell shaped air cells 25. The thigh cells 25 are housed in single file in an upholstered container which rides on top of the seat cushion 19. Nylon fastener strips (not shown) on the seat cushion upholstery, as well as on the underside of the thigh panel container, permit the thigh panels to be located at variable distances from the center of the seat cushion, or, if desired, removed entirely from the seat.

A lap belt strap 27, capable of extension or contraction, is connected via cable 29, through guide tube 31, to a lap belt-actuating mechanism which may be located beneath seat cushion 19. A similar strap and cable arrangement exists to the right of the seat permitting both ends of the lap belt to be simultaneously extended or contracted about the ventral area of a seated subject.

G seat 10 is also equipped with a standard shoulder harness 33. Although this harness is not actively driven, there is some coupling of the lap belt drive into the shoulder harness because the lap belt buckle also serves as a terminus for the shoulder straps.

The foregoing comprises the overall structure and form of the advanced G seat. The air cells and lap belt are individually pneumatically driven. Servo pressure valves, which respond to control signals provided, for example, by a computer, govern the pressure in the driven elements of the G seat. The computer determines cell pressure in accordance with a model which receives acceleration data input and converts this to a compliment of signals which control air cell excursion and belt-harness tension to produce appropriate skeletal attitude shifts, flesh pressure, gradients, changes in area of flesh contact and complimentary muscle tone changes.

Figure 2A:
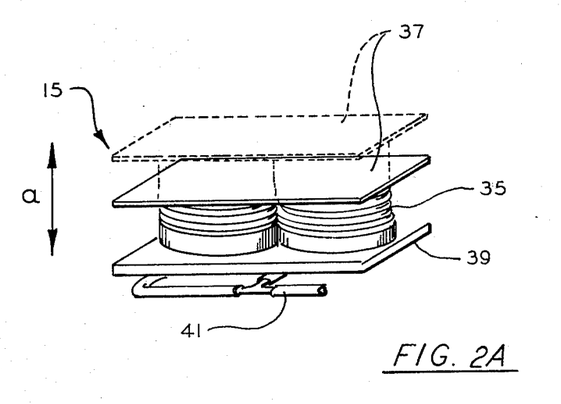
FIG. 2A is a perspective view of a back cushion cell useful in the instant invention.
Figure 2B:
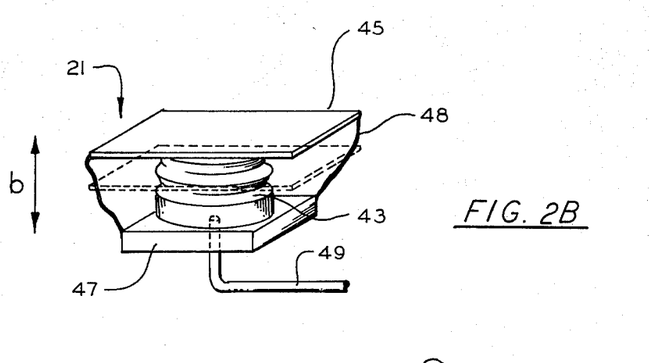
FIG. 2B is a perspective view of a seat cushion cell useful in the present invention.
Figure 2C:
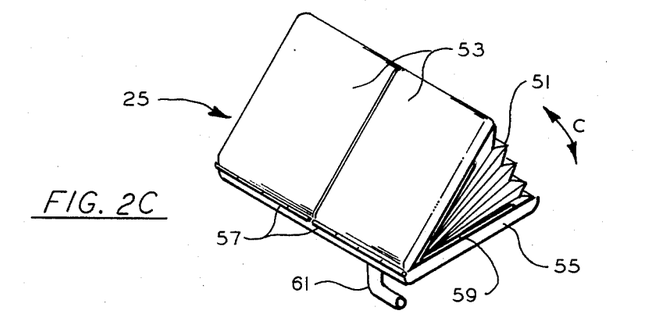
FIG. 2C is a perspective view of a thigh panel cell useful in the present invention.

The preferred construction of the air cells or driven elements of the G seat is shown in FIGS. 2A, 2B and 2C.

A backrest cell 15 is depicted in FIG. 2A. Cell 15 comprises two cylindrical metal bellows 35, sandwiched between rigid top plate 37 and bottom plate 39. Plates 37 and 39 may be epoxied or otherwise suitably affixed to the ends of bellows 35. Bellows 35 are tandemly driven via air supply hose 41, to displace top plate 37, as shown in phantom, in the direction indicated by arrow a.

Metal bellows are employed in the preferred embodiment of cell 15 since the design and construction of the metal bellows permits, via heat treating processes, the incorporation of a tensile spring rate during fabrication. Although the preferred embodiment of cell 15 contemplates a pair of metal bellows having strokes of approximately 2 and spring rates in a range between 20–50 pounds per inch of stroke, other drive means which will provide a comparable excursion range while maintaining the desired tension spring loading on top plate 37, may be used.

In FIG. 2B, a seat cushion cell 21 is illustrated. Cell 21 includes a metal bellows 43 having a stroke of about 21 inches and a spring rate in the range of 10–20 lb. per 3 inches of stroke, sandwiched between a rigid top plate 45 and bottom plate 47. Top plate 45 might, for example, be made of aluminum and have a 4 × 4 × ¼ rectangular solid shape. The other plates are preferably cemented to bellows 43 by epoxy. The pressure of the air supplied to bellows 43, by hose 49, can be varied to displace rigid top plate 45, as shown in phantom, along the excursion path indicated by arrow b. Capture tabs 48 may be connected between aligned corners of the top and bottom plates to preclude excess excursion.

It should be noted that the bellows mounting of the top plate in both the back cushion and seat cushion cells provides the top plate of these cells with the two degrees of rotational freedom necessary to form a near continuous seat surface. Of course, other drive mechanisms exhibiting similar excursion ranges and tension spring rates and providing the described two degrees of rotational freedom to the supported top plate, may be used in place of said bellows.

In FIG. 2C, a thigh air cell 25 is illustrated. Cell 25 comprises a plastic air bellows 51, of rectangular cross section, sandwiched between a split top plate 53 and bottom plate 55. The top and bottom plates of cell 25 are hinged together along one edge by hinges 57. A torsion bar 59 applies torsion spring loading to top plate 53. Pressurization of bellows 51, via air supply hose 61, causes the top plate of the clam-shell shaped air cell 25 to travel along an arc indicated by the arrow c. Top plate 53 is split to provide less discontinuity in fitting against a seated subject's thigh. Of course equivalent means for suitably driving top plate 53 may be substituted for bellows 51.

Certain common attributes of the backrest, seat pan and thigh panel air cells should be recognized. First, each of these cells has a solid top plate to isolate body flesh from the pliable surface of the cell, thus eliminating the problem of conflicting stimuli associated with prior art bladder seats. Second, each cell contains at least one bellows to channel pressure variations into top plate excursions. Finally, each cell is spring-loaded to prevent cushion "ballooning."

Figure 3:
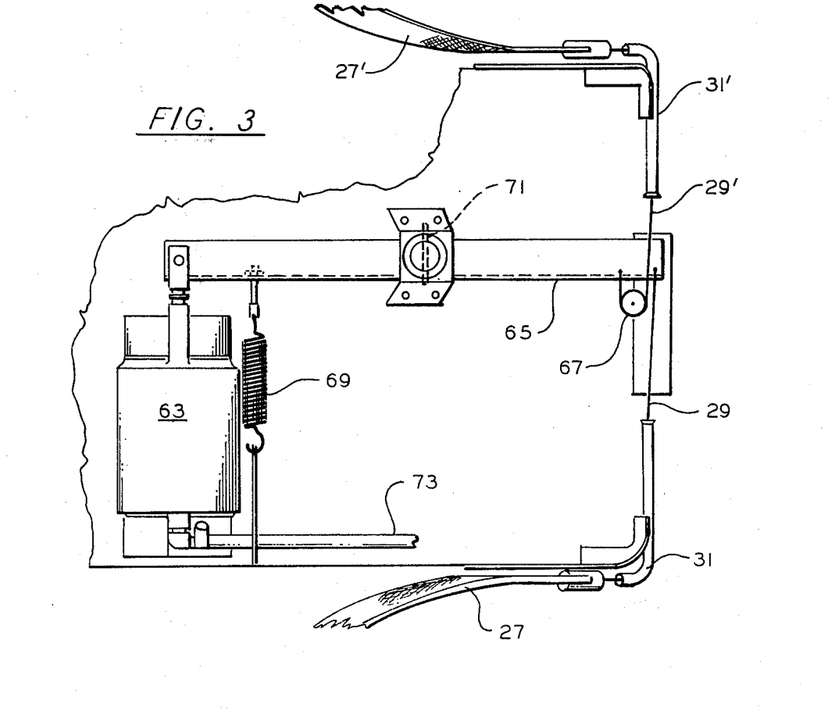
FIG. 3 is a view of the lap belt actuating mechanism of the present invention.

In the advanced G seat, a lap belt drive, capable of lap belt extension and contraction from both sides of the seat about some "snug buckle-up" state is used to provide ventral area pressure distribution stimulus. As pictured in FIG. 3, housed under the seat pan is an actuator 63 having a ram which is pneumatically controlled in much the same manner as the previously-discussed air cells. The actuator is connected to lap belt straps 27, 27' by a balance or pivot beam 65 and flexible cables 29, 29', located within rigid guide tubing 31, 31'. Cable 29' is wrapped around an independently supported pulley 67 so that both ends of the lap belt are identically affected by balance beam rotation. A spring 69 loads the ram of actuator 63 so that pressurization to approximately 4.5 psi centers the actuator ram near its mid-travel point. Balance beam 65 is equipped with a shear pin 71 which protects against excessive belt loads. By varying the pressure of air supplied to actuator 63, through supply hose 73, one can control lap belt forces applied to a seated subject.

Figure 4:
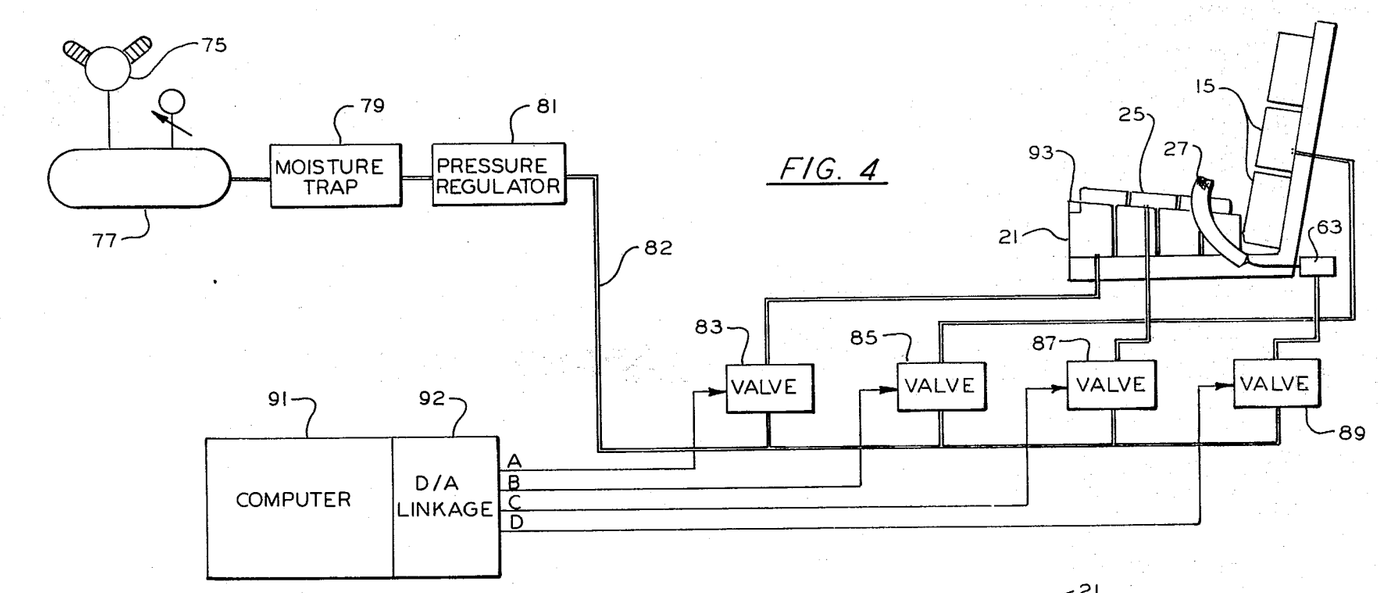
FIG. 4 is a schematic drawing of the control system of the instant invention.

FIG. 4 illustrates a preferred control system for operating the advanced G seat. A compressor 75 maintains a storage accumulator 77 at a desired pressure. Compressed air from accumulator 77 is passed through a moisture trap 79 and pressure regulator 81 and then over line 82 to servo pressure valves 83, 85, 87 and 89. These valves may be, for example, Electro-Pneumatic Transducers Model T-25 manufactured by the Conoflow Corporation, a division of ITT Hammerdahl, in Providence, R.I. These valves will provide a pressure output which is directly proportional to the current input. On the figure; only four representative valves are shown; in the actual G seat, one valve is provided for each air cell and one for the lap belt actuator. As illustrated, valve 83 provides pressurized air to seat cushion cell 21, valve 85 provides pressurized air to back cushion cell 15, valve 87 provides pressurized air to thigh panel cell 25 and valve 89 provides pressurized air to lap belt actuator 63.

The simulator computer 91 provides control signals to the valves; these signals are designated A, B, C and D on the figure. Computer 91 may represent any digital or analog computer capable of generating the required control signals from acceleration input data in real time. In most applications, the computer which controls the total aircraft simulator will be used to operate the G seat. In an actual reduction to practice, a Systems Engineering Laboratories' Systems 86 computer was used as the computational device. A D/A linkage, comprising a conventional digital-to-analog converter and smoothing filters, can be employed to convert the digital outputs from the digital computer to scaled analog signals.

In the preferred embodiment, digital computer signals for each driven element are made available to the D/A linkage unit 92 which in turn issues control signals to the electro-pneumatic transducers. The transducers respond to variations in the control signals with pressure variations altering extension of each driven element. The G seat drive scheme contained in the computer accounts for the internal spring rate of each individual element and employs a predetermined estimate of body loading each element currently experiences. The control signals are therefore issued in open loop fashion with no feedback to the computational system.

As the excursion of each driven element changes, the total shape, elevation, and attitude of the cushion surfaces change, thereby eliciting haptic sensory system stimuli from the subject seated upon the G seat. Overall cushion movement, as well as lap belt extension and contraction, is programmed to cause stimuli compatible with the existing simulated aircraft acceleration.

Figure 4A:
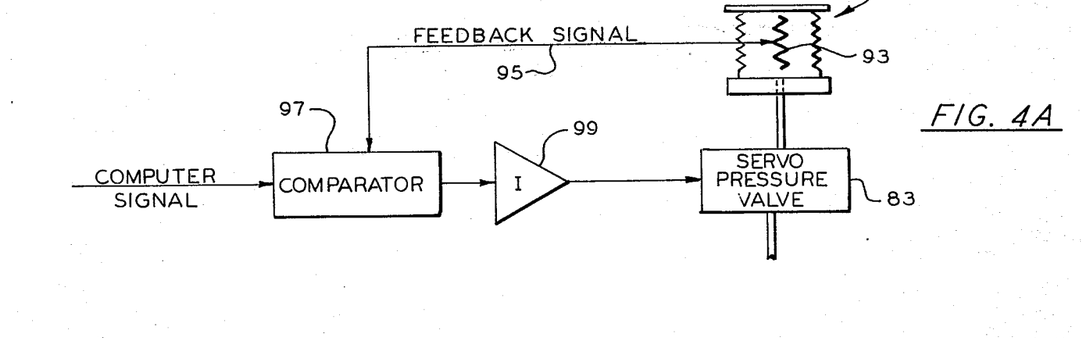
FIG. 4A illustrates a feedback loop of an alternate embodiment of the invention.
Figure 5:
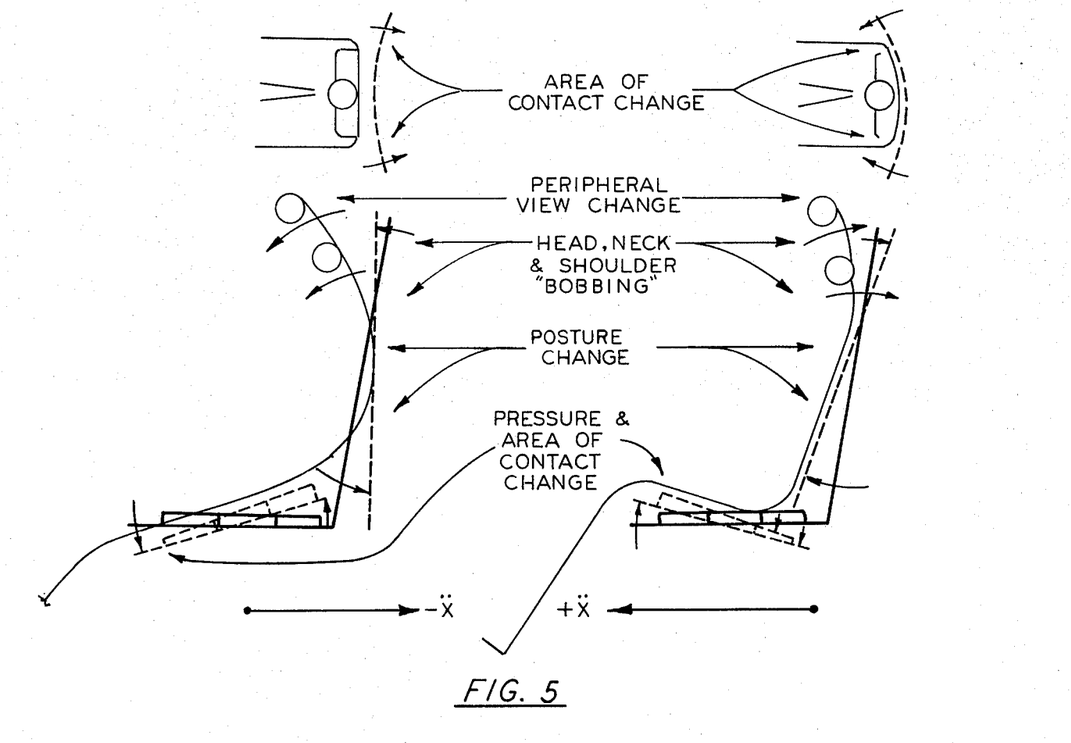
FIG. 5 is a drawing helpful in understanding the operation of the G seat in simulating longitudinal accelerations.
Figure 6:
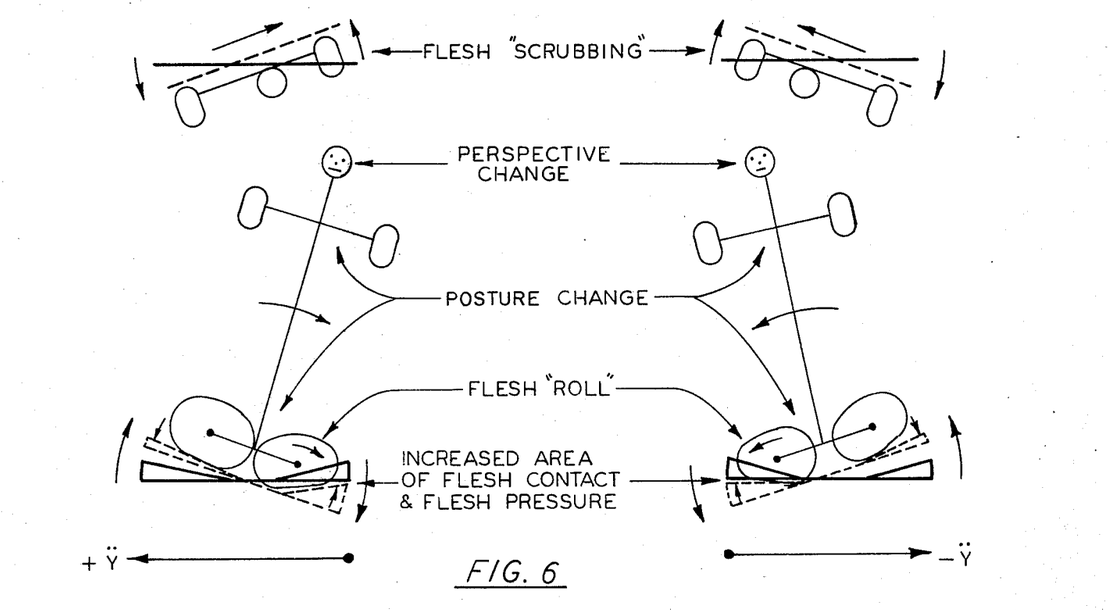
FIG. 6 is a drawing helpful in understanding the operation of the G seat in simulating lateral accelerations.
Figure 7:
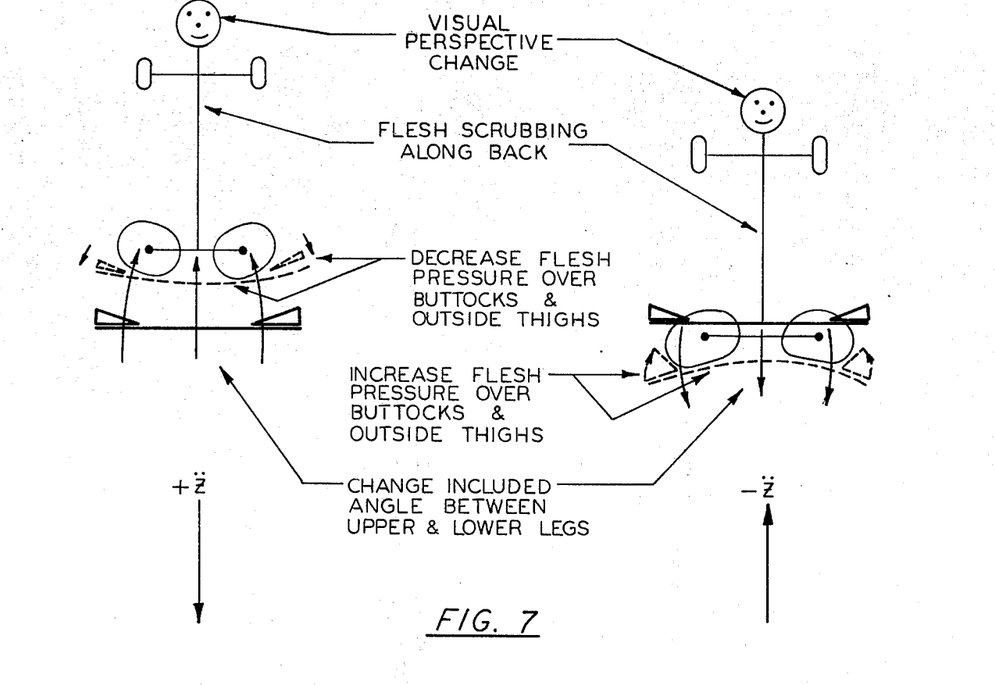
FIG. 7 is a drawing helpful in understanding the operation of the G seat in simulating vertical accelerations.
Figure 8:
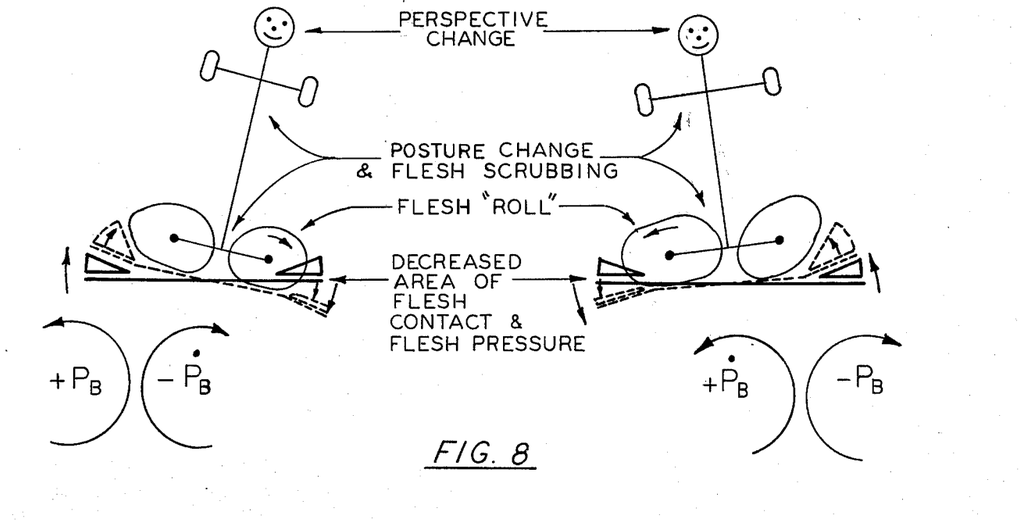
FIG. 8 is a drawing helpful in understanding the operation of the G seat in simulating roll velocities and/or accelerations.

An alternate method of driving the air cells, is illustrated in FIG. 4A. In this closed loop system, a positional monitoring device, such as a potentiometer 93, encased within air cell 21, provides a feedback signal 95, representative of actual cell excursion, to comparator 97. Comparator 97 compares this feedback signal with a computer control signal representative of desired excursion. When actual cell excursion differs from commanded cell excursion, the comparator 97 outputs an error signal which is integrated by integator 99 and then applied to servo pressure valve 83. Valve 83 varies the air pressure to, and thus the excursion of, cell 21 until actual excursion equals the commanded excursion. This closed loop scheme permits the simplification of the computer program and also the utilization of lower spring rates in the driven elements.

The following description of drive concepts for the G seat is valid for both open and closed loop systems.

As mentioned earlier, the lap belt acutator, the six thigh panel air cells, nine backrest air cells, and sixteen seat pan air cells are all treated as excursion devices. The amount of excursion is controlled by the pressure of air delivered to the devices, the load provided by the spring rate of the device, and the body load supported by the device. In the preferred drive scheme, seat cushion is treated as a scaled version of the magnitude of the current simulated aircraft acceleration, with maximum seat excursion reserved for some preset maximum anticipated aircraft acceleration.

In a normal 1 G state, the seat is maintained at a neutral point which is formed when the air cells and lap belt are near the mid points of their respective excursion ranges. By driving the excursion devices under suitable computer control, one is able to elicit compatible haptic system stimuli representative of that occurring under the actual accelerations. Skeletal attitude shifts are brought about by varying the overall elevation and attitude of the body supporting surfaces of the seat cushions. Flesh pressure gradient changes may be independently achieved by controlling the elevation of a cell with respect to the elevation of neighboring cells. The mosiac form of the seat pan and back rest, and in particular the large number of mosaic elements, and consequential small surface area of each element, make this "contouring" approach feasible. The combined action of thigh panels and seat pan cells and/or the contouring approach may be used to produce changes in area of flesh contact. Muscle tone changes inherently accompany skeletal attitude shifts.

Although various models to drive the G seat in response to simulated aircraft accelerations are possible, the following drive configuration represents the presently preferred manner of driving the G seat:

The axis system used by the G-seat drive as a reference frame is constructed parallel to the aircraft body axis system; however, the origin is transferred to the pilot station and located at the approximate position of the pilot's torso. The + X axis is directed forward, generally along the thrust vector, the + Z axis is directed footwards, generally along the gravity vector when the aircraft is standing on the runway, and the + Y axis completes the right triad.

The simulated accelerations employed by the G-seat model are flight translational accelerations transferred from the aircraft center of gravity to the pilot station axis, wherein aircraft rotational acceleration materializes as an induced translational acceleration and is vectorially added to the pure translational acceleration components. Although these three translational acceleration components form the primary input to the G-seat model, exception is made for aircraft roll acceleration. Because of the small moment arm between the pilot station origin and the aircraft roll axis, a separate section of the G-seat model accepts and displays roll effects directly, rather than depending upon roll effects materializing as useful induced translation.

DRIVE CONCEPTS

Seat Translation

The elevation of a complete set of cells, either or both the seat pan set or the backrest set, is caused to translate in unison a uniform distance. In the case of the seat pan, the translation abides by the activity of the Z axis acceleration component. Positive (footwards) acceleration produces increased seat pan air cell elevation and negative (headwards) acceleration produces a decrease in seat pan elevation. The backrest cells are similarly sensitive in a like manner to X axis accelerations, with an identical sign/excursion relationship to that indicated immediately above.

Seat Plane Orientation

The plane formed by a complete set of cells, either or both the seat pan set or backrest set, is caused to be reoriented. The key to the reorientation is the seat pan plane which is driven, within the bounds of cell excursion, so that it approximates an orientation normal to the total acceleration vector. Remembering that one of the underlying concepts of the G-seat drive is that of scaling maximum excursion to maximum anticipated acceleration, it should be noted that the seat pan plane will not, in practice, be normal to the actual total acceleration vector, but rather to a scaled version thereof. This provides plane reorientation in the correct direction but at reduced magnitudes.

The plane of the backrest is driven in a similar manner to that of the seat pan. That is, when the seat pan plane is pitched up, the corresponding backrest plane is also pitched up, or top rearward and bottom forward. Seat pan plane and backrest plane sign convention for the Y axis is consistent; for example, seat pan movement left is accompanied by backrest movement left.

Contouring

Either or both the seat pan and backrest may be caused to assume a contoured shape which produces a flesh pressure redistribution thought to be compatible with body response to acceleration along any one or combination of axes. Six basic contours are considered; each pertains uniquely to either a positive or negative acceleration along one of the seat axes. The degree of contouring is governed by the magnitude of the acceleration component. Contour mixtures are realized in multicomponent acceleration profiles.

Thigh Panel Drive

Thigh cell excursion responds to any or all of the lateral (Y), longitudinal (X), and vertical (Z) acceleration components. The individual thigh cells respond uniformly to lateral acceleration. Rightward seat acceleration causes the right thigh panel to decrease in elevation and the left thigh panel to increase a commensurate amount. The reverse is true of leftward seat acceleration.

Secondly, the longitudinal consideration causes thigh panel response to X axis acceleration components. In this case the concept of a splay angle is introduced. Since excursion of the thigh cells is pie-shaped, fully inflating the forward air cell, partially inflating the middle cell, and exhausting the rear cell causes the surface of the thigh panel to be skewed by an angle referred to herein as a splay angle. The thigh panels are driven so that response to −X acceleration components yields splaying apart of the forward sections of the thigh panels. Similarly, the response to +X acceleration components is a splaying apart of the rear sections of the thigh panels. The severity of the splay angle is governed by the magnitude of the acceleration vector.

Vertical acceleration response of the thigh panels is a simultaneous uniform increase or decrease in the arc struck by each of the thigh panel cells. This is quite similar, in concept, to the seat pan translational concept, except that the excursion direction is reversed. For example, when the seat pan is caused to settle under headwards aircraft acceleration conditions, the arc struck by the thigh panels is caused to increase, bringing more of the seat into flesh contact and enhancing the feeling of "settling into the seat."

ROLL CONSIDERATION

Roll represents rotation about the simulated aircraft's longitudinal axis. As mentioned earlier, special provision is made to display roll effects. Under this concept it is possible to bias the excursion drive of the thigh panels and/or the outboard bank of seat pan air cells forming the thigh panel underlayment with an additional excursion which follows either the aircraft roll acceleration magnitude ($\ddot{P}_B$) or roll velocity magnitude ($\dot{P}_B$).

Lap Belt

The lap belt drive concept employs two informational sources: the orientation of the gravity vector projection on the XZ plane relative to the seat axis, and the orientation of the external force acceleration vector projection on the XZ plane relative to the seat axis. The latter excludes the effects of relative gravity orientation considered by the former.

Both vector projection orientations are employed in predetermined functions to arrive to separate lap belt force commands which are, in turn, summed.

The effect of the first drive source will cause the lap belt to contract as the seat and aircraft pitch over to the point where the subject is inverted ($-\ddot{X}$), and relax again as an upright attitude is approached ($+\ddot{X}$). Meanwhile, the second drive source abides by the external force acceleration projection so that belt contraction is experienced during loss of lift or sink periods ($+\ddot{Z}$) and belt extension occurs during headwards acceleration periods ($-\ddot{Z}$). The lap belt does not respond to Y axis acceleration components.

It is plain from the preceding description that the basic drive concepts impose multiple excursion demands upon the individual air cells. Each concept is permitted to contribute, by a preset percentage, to total cell excursion. Total cell excursion, therefore, is obtained as the algebraic sum of the excursion commands demanded by each concept.

The excursion characteristics of each cell, as driven by its respective pneumatic transducer, are maintained in array form and accessed by the computer in computing the final drive commands issued to the linkage. These commands account for a subject weight of 160 pounds; should the weight of the subject differ radically from this value, drive rebiasing is established by the computer upon manual input of subject weight.

FIGS. 5–8 schematically represent the seat component response and elicited cues for various representative acceleration vectors under the above-described drive configuration. In each of these self-explanatory schematics, the solid line represents the seat component under normal 1 G conditions; the dotted line represents the component shape resulting from consideration of the sample acceleration. Mixtures of the seat component responses portrayed in FIGS. 5–8 are employed to simulate multi-component acceleration profiles.

It should thus be clear that the instant invention provides a unique G seat capable of supplying effective kinesthetic feedback to a pilot trainee in an aircraft simulator. Although the invention has been described in connection with a typical seat in an aircraft simulator, the principles involved can easily be applied to any shaped seat or, for that matter, other body-supporting structure in any vehicle simulator. Similarly the number of air cells may vary and the cells may be arranged in mosaic patterns other than the illustrated checkerboard like configuration. Instead of a pneumatic drive system, a comparable hydraulic (i.e., any fluidal system), mechanical or other system may be employed. As an alternative to computer control, the valves of the G seat may be directly linked to the aircraft controls and instruments, an instructor console or other control signal generator. Furthermore, it will be readily appar-

What we claim is:

1. A seat for use in a vehicle simulator comprising:
   support means;
   a mosaic of driven elements supported on a first planar surface of said support means, each driven element having a rigid top plate, the top plates of said elements defining a body portion-supporting surface, the top plates being individually and selectively translatable by the driven elements in a direction perpendicular to said first surface of the support means, said driven elements comprising fluid cells;
   means for driving said driven elements; and
   means for coordinating the translation of the individual top plates to vary the elevation and attitude, and the contour of said body portion-supporting surface in a manner which produces, upon an occupant of said seat, compatible skeletal attitude shifts and flesh pressure gradient variations in said body portion, respectively.

2. The seat of claim 1, wherein said elements comprise air cells.

3. The seat of claim 1, wherein said plates are tension spring loaded.

4. The seat of claim 1, wherein said elements comprise tension spring loaded bellows.

5. The seat of claim 1, wherein said elements comprise metal bellows having predetermined tension spring rates.

6. The seat of claim 1, further comprising: an additional driven element having a rigid top plate, said additional element being positioned near a side edge of the body supporting surface and being operable to impart motion to its top plate along an arc to selectively contact a thigh of said occupant.

7. The seat of claim 6, wherein the top plates of the driven elements supported on said one surface of the support means are tension spring loaded; and the top plate of said additional driven element is torsion spring loaded.

8. The seat of claim 1 wherein said coordinating means comprises:
   means for generating a control signal for at least one of said elements which includes a body excursion component and a flesh pressure redistribution component; and
   means for driving said one element in response to said control signal.

9. A method of simulating acceleration effects, comprising:
   positioning a subject in a seat so that at least a portion of the subject's body is supported by a surface formed by a mosaic of individually translatable plates, each of said plates being translatable in a direction parallel to the direction of translation of the other plates; and
   translating said plates selected distances to induce a skeletal attitude shift of said subject corresponding to that produced by an acceleration being simulated, and simultaneously further altering the relative position of at least one of said plates within said mosaic to produce a compatible haptic system stimulus across the supported portion of the subject's body similar to that produced by the acceleration being simulated.

10. The method of claim 9, wherein said compatible haptic system stimulus comprises a pressure gradient variation.

11. The method of claim 9, wherein said compatible haptic system stimulus comprises an area of flesh contact change.

12. The method of claim 9, wherein said supported body portion comprises the subject's buttocks and further including the steps of:
   employing thigh panels adjacent the side edges of said surface to selectively contact the subject's thighs;
   employing a lap belt to independently and selectively apply pressure across the seated subject's ventral area; and
   coordinating the operation of the thigh panels, lap belt and translatable plates to produce compatible haptic system stimuli for the acceleration being simulated.

13. In a vehicle simulator, apparatus for inducing motion sensations corresponding to those experienced during actual operation of the vehicle, comprising:
   a. a seat comprising:
      1. a supporting structure, and
      2. a first cushion supported by said supporting structure and including a first plurality of air cells having rigid top plates defining a body supporting surface of said first cushion, the air cells of said cushion responding to air pressure variations by displacing said top plates;
   b. first means for generating control signals representative of air pressures in said air cells which will cause selective displacement of said top plates to vary the elevation, attitude and contour of said body supporting surface in a manner which induces compatible haptic sensory system stimuli in an occupant of said seat; and
   c. second means for varying the air pressure in said air cells in response to said control signals, whereby motion sensations corresponding to those experienced during actual operation of the vehicle are produced.

14. The apparatus of claim 13, further comprising a second cushion supported by said supporting structure, said second cushion including a second plurality air cells having displaceable rigid top plates, the air cells in said second plurality also responding to air pressure variations provided by said second means, under control of said first means, by displacing their top plates.

15. The apparatus of claim 14 wherein the air cells of said first and second pluralities comprise tension spring loaded bellows.

16. The apparatus of claim 15 wheren said first cushion is a seat pan and said second cushion is a backrest and further including a thigh panel located adjacent a side edge of the seat pan.

17. The apparatus of claim 16 wherein the thigh panel contains at least one clam-shell shaped air cell having a torsion spring loaded displacable rigid top plate, said clam-shell shaped air cell responding to air pressure variations provided by said second means, under control of said first means, by displacing its top plate.

18. The apparatus of claim 17 further including a lap belt for said seat and actuator means for selectively extending and contracting said lap belt about the ventral area of the occupant of said seat.

19. The apparatus of claim 18 wherein said lap belt actuator means responds to air pressure variations provided by said second means, under control of said first means; and said first means includes means for coordinating the operation of the seat pan air cells, backrest air cells, thigh panel air cells and lap belt actuator means.

20. The apparatus of claim 19 wherein said first means comprises a comuter; and said second means comprises an individual servo pressure valve for each of said air cells and said lap belt actuator means.

21. The apparatus of claim 16 further including means for caausing splaying of said thigh panel.

22. The apparatus of claim 14 wherein each of the air cells of said second plurality includes a pair of tandemly driven metal air bellows.

23. The apparatus of claim 14 wherein the air cells in said first and second pluralities arranged in matrix configurations.

24. The apparatus of claim 13 further comprising positional transducer means located in said air cells to provide feedback signals representative of actual displacements of the top plates of said air cells, and comparator means for comparing said feedback signals with said control signals and providing an error signal to actuate said second means whenever said feedback signals and control signals are unequal.

25. The apparatus of claim 13 wherein said first means includes:

means for generating elevation, attitude and contour excursion commands for at least one of said air cells;

means for deriving a weighted sum of said excursion commands; and means for generating a control signal for said one cell representative of said weighted sum of excursion commands.

26. Apparatus for use in simulating vehicular motion, comprising:

first means for supporting a seated subject;

second means, supporting a portion of said subject's body within said first means, for simultaneously, independently varying the seated subject's skeletal attitude, changing the extent of contact between said second means and said body portion and altering the flesh pressure gradient across said body portion; and third means for automatically controlling said second means so that the independent skeletal attitude shifts, changes in extent of contact and pressure gradient alterations produced by said second means are coordinated to provide scaled, compatible haptic sensory system stimuli to said seated subject.

27. The apparatus of claim 26 wherein said second means includes means capable of altering the flesh pressure gradient across substantially all of said portion of the seated subject's body.

* * * * *

UNITED STATES PATENT AND TRADEMARK OFFICE
CERTIFICATE OF CORRECTION

PATENT NO. : 3,983,640
DATED : October 5, 1976
INVENTOR(S) : Frank M. Cardullo et al It is certified that error appears in the above-identified patent and that said Letters Patent are hereby corrected as shown below:

Column 2, line 48, omit "necessary".

Column 7, lines 62 and 63, change "cushion" to --excursion--.

Column 12, line 46, insert --of-- after "plurality".

Column 13, line 10, "comuter" should be --computer--.

Signed and Sealed this

Fourteenth Day of June 1977

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 3,983,640
DATED : October 5, 1976
INVENTOR(S) : Frank M. Cardullo et al It is certified that error appears in the above-identified patent and that said Letters Patent are hereby corrected as shown below:

Column 12, line 27, insert --, the top plates-- after "plates";

Column 13, line 15, substitute --causing-- for "caausing".

Signed and Sealed this

Fourteenth Day of March 1978

[SEAL]

Attest:

RUTH C. MASON
Attesting Officer

LUTRELLE F. PARKER
Acting Commissioner of Patents and Trademarks